(12) United States Patent
Tsunoda et al.

(10) Patent No.: US 8,797,316 B2
(45) Date of Patent: Aug. 5, 2014

(54) METHOD FOR DEFINING FLUID/SOLID BOUNDARY FOR COMPUTATIONAL FLUID DYNAMICS SIMULATIONS

(75) Inventors: Masaya Tsunoda, Kobe (JP); Arjun Yadav, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 782 days.

(21) Appl. No.: 12/966,393

(22) Filed: Dec. 13, 2010

(65) Prior Publication Data

US 2011/0242095 A1    Oct. 6, 2011

(30) Foreign Application Priority Data

Mar. 31, 2010 (JP) ................................ 2010-082785

(51) Int. Cl.
*G06T 15/00* (2011.01)
*G06T 17/00* (2006.01)
*G06T 17/20* (2006.01)
*G06G 7/50* (2006.01)
*G06F 7/00* (2006.01)

(52) U.S. Cl.
USPC ........... 345/419; 345/420; 345/423; 345/424; 703/9; 707/797

(58) Field of Classification Search
CPC . G06F 17/5009; G06F 17/5018; G06K 9/627; G06K 9/6276; G06T 17/20
See application file for complete search history.

(56) References Cited

U.S. PATENT DOCUMENTS

| 7,239,990 B2* | 7/2007 | Struijs ............................... 703/2 |
| 2008/0177511 A1* | 7/2008 | Kamatsuchi ..................... 703/1 |
| 2009/0210413 A1* | 8/2009 | Hayashi et al. ................... 707/5 |

* cited by examiner

*Primary Examiner* — Tize Ma
(74) *Attorney, Agent, or Firm* — Birch, Stewart, Kolasch & Birch, LLP

(57) ABSTRACT

A method for defining a fluid/solid boundary for computational fluid dynamics simulations making use of a coordinate system mesh and a solid object model, which includes the steps of defining straight lines on which all of the grid points of the coordinate system mesh are positioned; obtaining intersecting points of the straight lines with the surface of the solid object model; and a step in which, for each of the straight lines having the intersecting points, the grid points on the straight line are searched for the nearest point to each of the intersecting points, and based on the searched-out nearest points, the positioned grid points are determined as to whether the grid point is positioned inside the solid object model or in the fluid region.

4 Claims, 15 Drawing Sheets

METHOD FOR DEFINING FLUID/SOLID BOUNDARY FOR COMPUTATIONAL FLUID DYNAMICS SIMULATIONS

BACKGROUND OF THE INVENTION

The present invention relates to a method for defining a boundary between a solid object model and a fluid model for computational fluid dynamics simulations, more particularly to a high speed algorithm for separating a coordinate system mesh into a fluid region and a solid region.

In recent years, computational fluid dynamics simulations are utilized in various fields in order to analyze various flow types such as: flow of air around a golf ball, flow of rubber out of an extruder, and flow of composite materials in a mixing device for the purpose of developing the dimples capable of improving flying characteristics of the golf ball, the extruder having a reduced resistance to extrusion, and the mixing device capable of improving the property of the composite for example.

In the computational fluid dynamics simulations, usually, grid points are arranged in a region of three-dimensional space in a basic coordinate system, and
a fluid model is defined by the grid points at which physical quantities such as temperature, pressure, velocity and the like of the fluid are defined.
On the other hand, a solid object model is defined by finite elements having node points.

For example in case of immersed boundary method or Chimera method, where the solid object model overlaps with the grid points which are arranged in the three-dimensional space to define the fluid model, it is necessary to know which of the grid points are positioned inside the solid object model, and which of the grid points are positioned outside the solid object model, and it is very important to quickly define the boundary between the fluid region and solid region on the grid points.

In order to define the boundary on the grid points, the most commonly employed method is such that, for each of the node points positioned at the surface of the solid object model, the grid points are searched for a point nearest to the node point under consideration.
This type of search is known as Nearest neighbor search.
The approaches to accelerate Nearest neighbor search heretofore proposed can be classified into two types:
1) narrowing candidates of nearest neighbors, and
2) pruning of distance computation.
In such accelerated Nearest Neighbor search, however, when the number of the grid points and node points is increased, the computing time becomes still long.
Even in the recently developed Nearest neighbor search algorithms such as ANN and kd-Tree, the same type of problems arise.
Therefore, in such fluid dynamics simulations that the solid object model is moved and/or deformed, the search and definition of boundary points have to be made iteratively, therefore, hitherto known inefficient slow Nearest Neighbor search algorithms involve enormous computing time.

SUMMARY OF THE INVENTION

It is therefore, an object of the present invention to provide a method for defining a fluid/solid boundary for computational fluid dynamics simulations, in which,
by utilizing intersecting points of the surface of a solid object model and straight lines defined to pass through grid points of a coordinate system mesh,
a boundary between the solid object model and a fluid region of the coordinate system mesh can be very quickly and efficiently defined on the coordinate system mesh, therefore, even in a large scale model, fluid dynamics simulations can be made in reduced computing times.

According to the present invention, a method for defining a fluid/solid boundary is for computational fluid dynamics simulations making use of
a coordinate system mesh which models a region of three-dimensional space including a fluid region, and which is defined by a large number of grid points arranged in the region of three-dimensional space, and
a solid object model which models a solid object, and whose surface is constituted by planes of finite elements, and
the method comprises
a step of preparing the solid object model in a computer,
a step of preparing the coordinate system mesh in the computer,
a step of defining, in the computer, straight lines which extend across the above-mentioned region of three-dimensional space, passing through the grid points,
a step of obtaining intersecting points of the straight lines with the surface of the solid object model,
a step in which, for each of the straight lines having the intersecting points, the grid points positioned on the straight line are searched for a nearest point to each of the intersecting point, and
based on the searched-out nearest points, the grid points positioned on the straight line are determined about whether the grid point is positioned inside the solid object model or in the fluid region, whereby
all of the grid points arranged in the region of three-dimensional space are determined about whether the grid point is positioned in the fluid region or inside the solid object model and thereby the boundary between the solid object model and the fluid region is defined on the coordinate system mesh.

DESCRIPTION OF THE PREFERRED EMBODIMENTS

Embodiments of present invention will now be described in detail in conjunction with accompanying drawings.

A method for defining the boundary between a solid object model 2 and a fluid model according to the present invention is performed by a computer 1, and in this embodiment, constitutes part of the process of fluid dynamics simulations.

Figure 1:
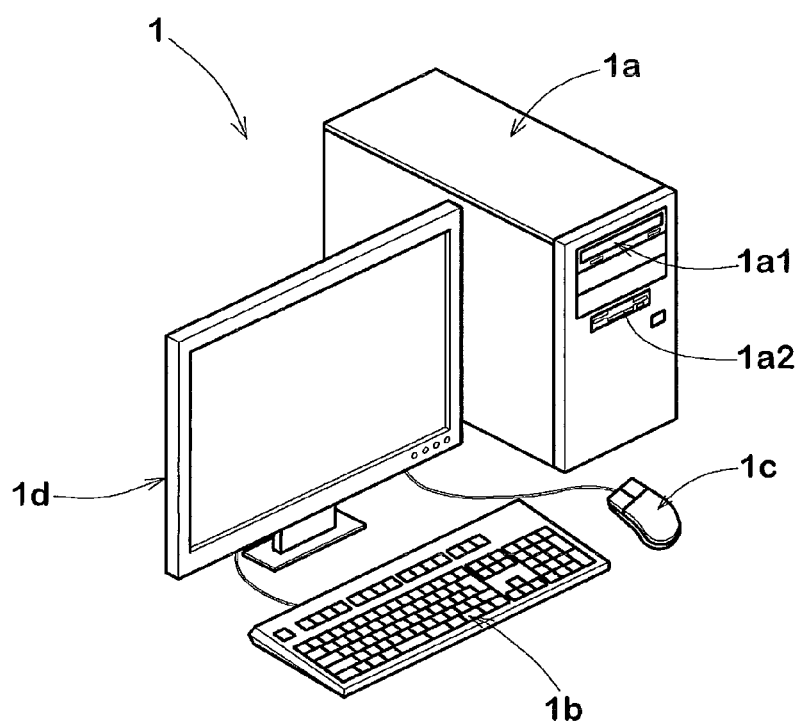
FIG. 1 is shows a computer for executing a boundary definition method according to the present invention.

The computer 1 comprises, as shown in FIG. 1, a main units 1a, input devices such as keyboard 1b and mouse 1c, and output devices such as video display unit 1d. The main units 1a comprises the central processing unit, memories, storage device such as magnetic hard disk, disk drives such as optical disk drive 1a1 and flexible disk drive 1a2, and the like. In the magnetic hard disk, programs to perform the method according to the present invention are stored.

The solid object model 2 is a three-dimensional mesh of a solid body (nonfluxional body) modeled with a finite number of elements. For example, the solid body is a golf ball.

The fluid model is a three-dimensional mesh of fluid modeled with a finite number of elements. For example, the fluid is air surrounding the solid body.

In this embodiment, the fluid model is an Eulerian mesh, and the solid object model 2 is a Lagrangian mesh.

The solid object model 2 is disposed in a coordinate system mesh 3 to overlap wholly or partially therewith, and the above-mentioned fluid model is defined by the part of the coordinate system mesh 3 which is not overlapped with the solid object model 2, in other words, positioned outside the solid object model 2.

The coordinate system mesh 3 is defined by grid points 3a. The grid points 3a are arranged in a region of three-dimensional space in a basic coordinate system.
An orthogonal coordinate system, a cylindrical coordinate system or a spherical coordinate system can be employed as the basic coordinate system.
As explained hereunder, the grid points 3a are aligned with the axes/directions of the basic coordinate system.

At the grid points 3a of the coordinate system mesh 3 as the fluid model, physical quantities such as fluid pressure, temperature, velocity and the like are defined as unknown quantities.

In case that flow of the fluid and deformation of the solid body are to be considered or simulated through a numeric analysis method such as finite element method, the surface and internal structure of the solid body can be modeled with Lagrangian elements whose unknown quantities are for example their displacement.

In case that flow of the fluid is to be considered or simulated but it is not necessary to consider or simulate deformation of the solid body, the internal structure of the solid body can be omitted from the solid object model 2.

Thus, the solid object model 2 can be formed as a closed surface model 2a like a shell structure in which only the surface of the solid body is modeled with the planar elements (e) linked with each other. As to the planar elements (e), rigid planar elements can be used. These help to reduce the time for generating the solid object model 2.

Figure 2:
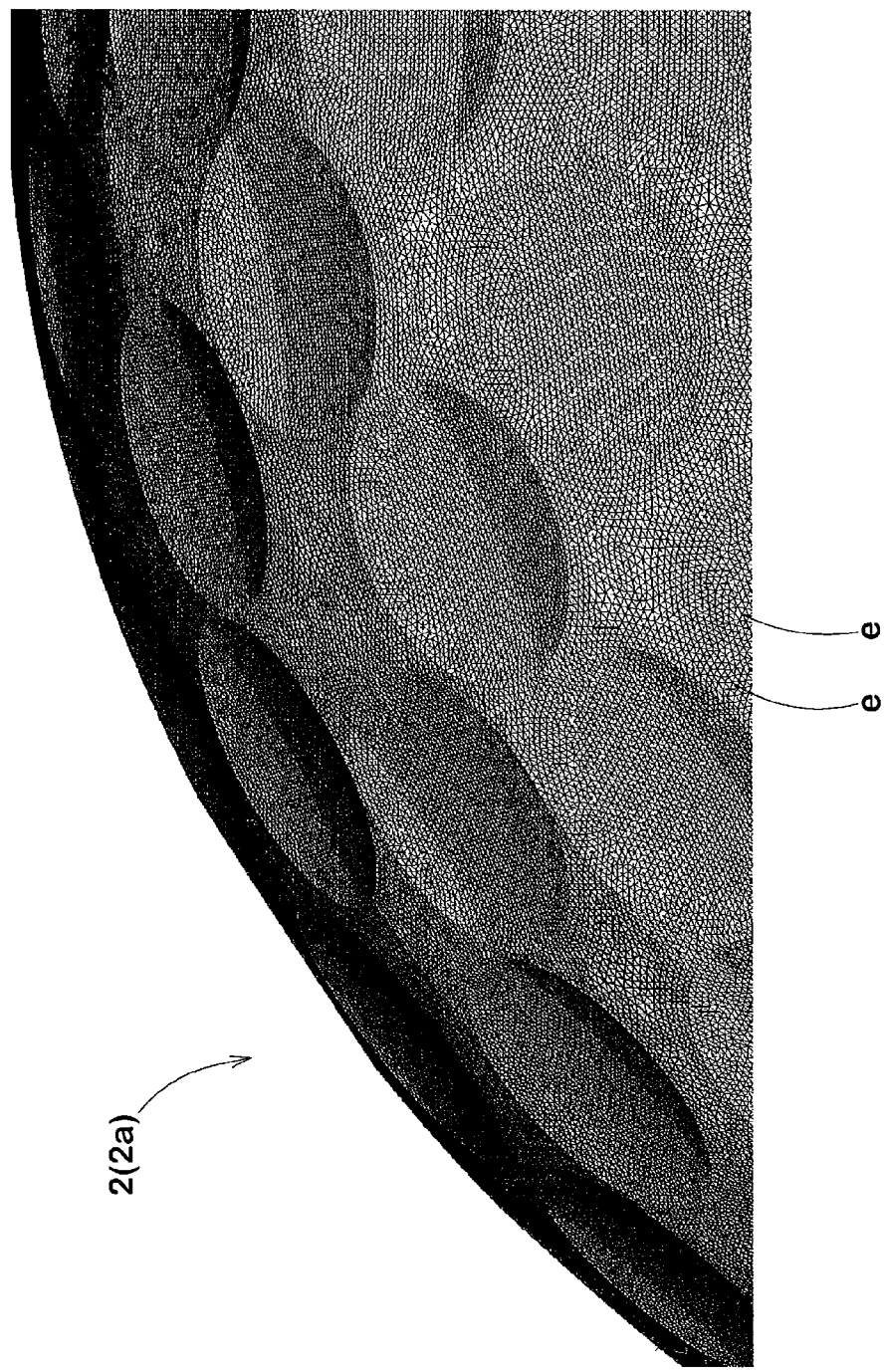
FIG. 2 is a partial perspective view of an example of the solid object model.

FIG. 2 shows a part of the solid object model 2 which is a closed surface model 2a of a golf ball. In this example, only the surface of the golf ball is modeled with a large number of triangular planar elements (e) which are linked with each other into a spherical shape with dimples.

Regardless of whether the surface of the solid object model 2 is defined by planar elements or not, planes of the elements (e) which planes collectively define the surface of the solid object model 2 are hereinafter referred as the element surface planes (n). Therefore, in the case of the golf ball model shown in FIG. 2, the element surface plane (n) is a triangle. If quadrilateral elements (e) are used, the element surface plane (n) is a rectangle.

According to the present invention,
the solid object model 2 is prepared in the above-mentioned computer 1. This means that data about at least the configuration of the surface of the solid object model 2 are loaded and stored in the storage device of the computer 1.

Further, the coordinate system mesh 3 is prepared in the computer 1. This means that data about at least the coordinates of the grid points 3a in the basic coordinate system are loaded and stored in the storage device of the computer 1.

Then, a boundary definition processing is performed in order that the boundary between the solid object model 2 and fluid model is defined on the coordinate system mesh 3. (Step S3)

Firstly, taking an orthogonal coordinate system as the basic coordinate system, the boundary definition processing will be described hereinafter.

Figure 3:
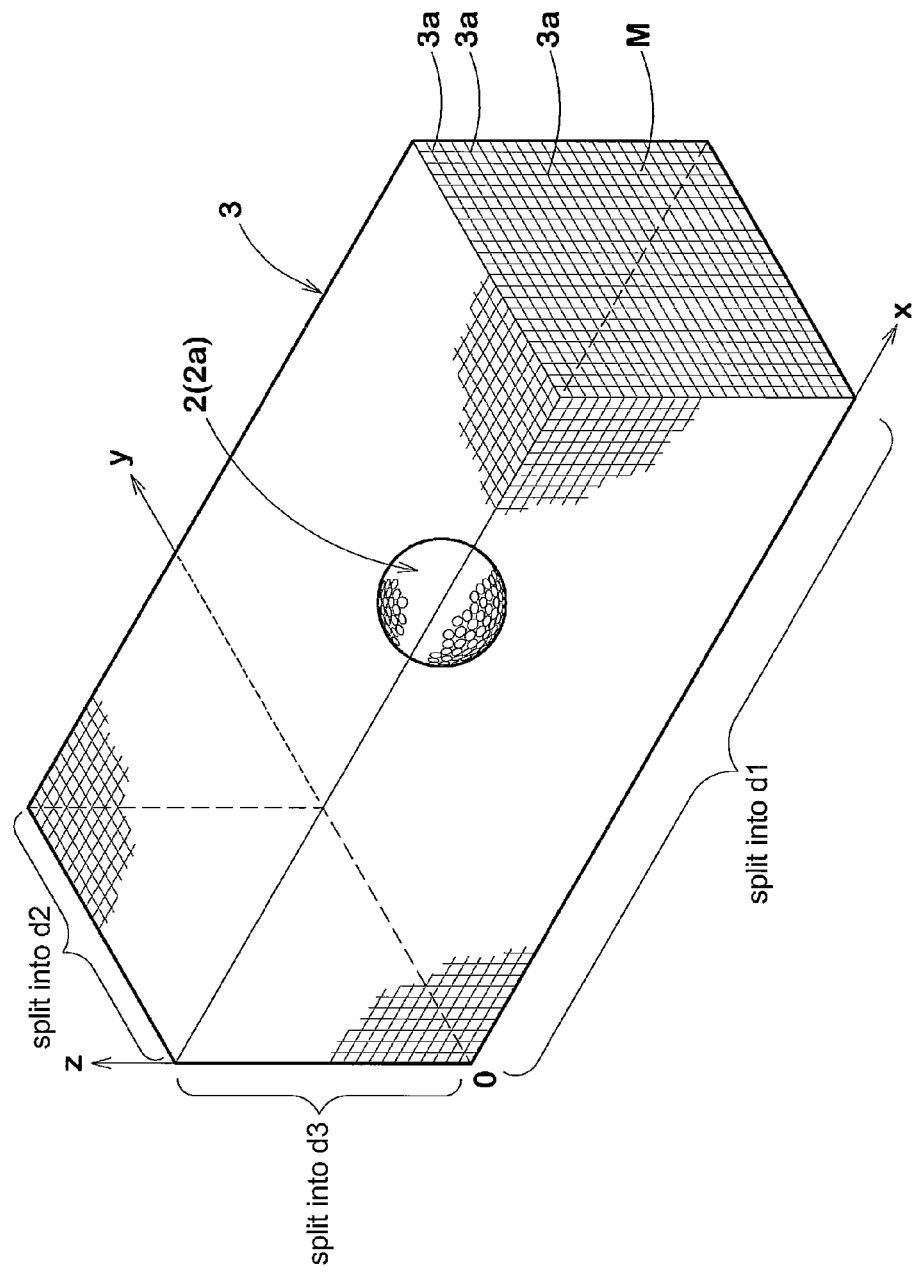
FIG. 3 is a perspective view of an orthogonal coordinate system mesh.
Figure 4:
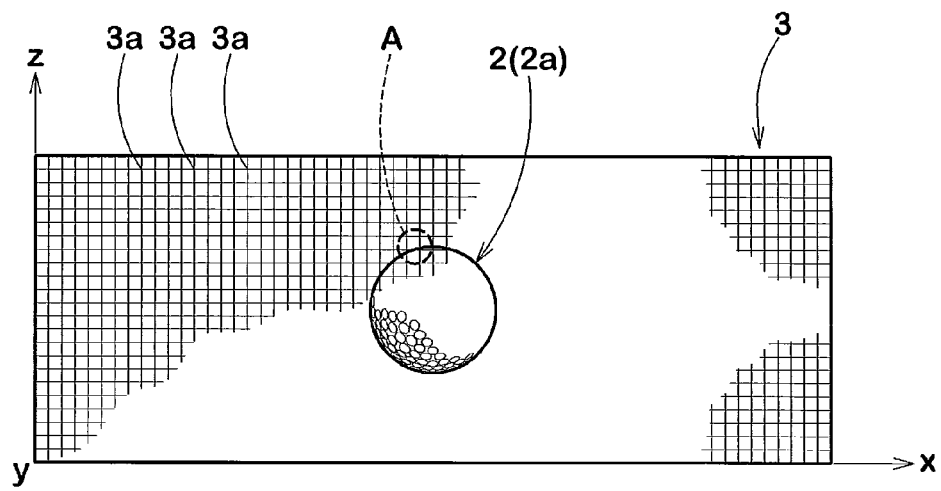
FIG. 4 is a side view thereof.

As shown in FIG. 3 and FIG. 4, the coordinate system mesh 3 in this example is an orthogonal mesh M defined in a form of a substantially rectangular parallelepiped which has 3D sizes capable of encompassing the object (golf ball) model 2 completely in order to simulate air flow around the entire surface of the solid object model 2.

The orthogonal mesh M is divided by
a positive integer d1 in X-axis direction,
a positive integer d2 in Y-axis direction and
a positive integer d3 in z-axis direction in the X-Y-Z orthogonal coordinate system of the three-dimensional space.
The grid points 3a are disposed at cross-points of the mesh lines of the orthogonal mesh M.

As to the spacings of the mesh lines, for example, in the case of a golf ball model 2 having an outer diameter of 42.7 mm, it is preferable that
the distance between the grid points in x-axis direction,
the distance between the grid points in Y-axis direction and
the distance between the grid points in x-axis direction
are each set in a range of from 0.025 mm to 1.0 mm.

Incidentally, these distances can be changed, depending on the 3D sizes of the solid object model 2, required analytical accuracy, fluid velocity and the like. The 3D sizes and shape of the coordinate system mesh 3 can be changed, depending on the region to be simulated.

Figure 5:
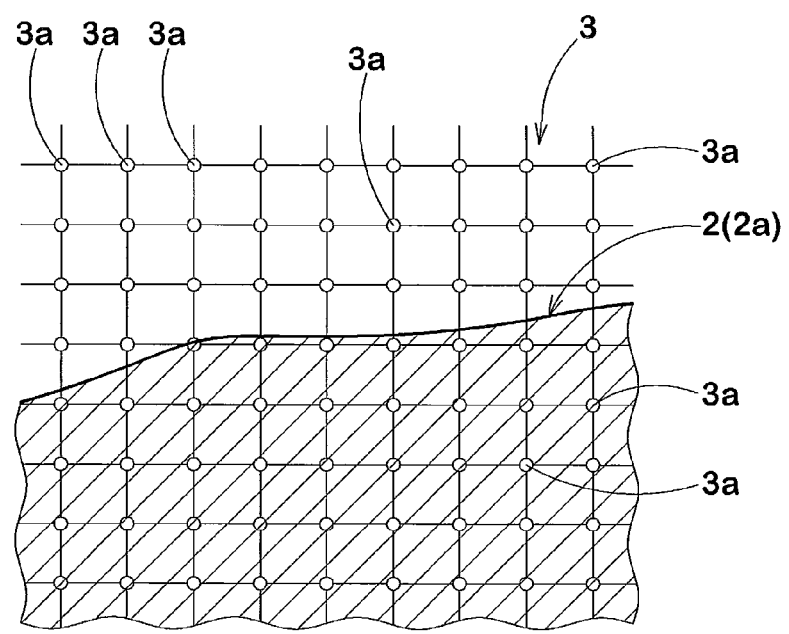
FIG. 5 is a magnified figure of part A of FIG. 4.

The solid object model 2 is placed in the coordinate system mesh 3 so as to wholly overlap with the coordinate system mesh 3 as shown in FIG. 3.
FIG. 5 is a magnified figure of part A of FIG. 4.
As shown in FIG. 5 by hatching, some of the grid points 3a of the coordinate system mesh 3 are positioned inside the solid object model 2 where no flow occurs. Therefore, in performing the fluid simulation, it is necessary to determine
which of the grid points 3a are positioned inside the solid object model 2, and accordingly
which of the grid points 3a are positioned outside the solid object model 2, and the boundary is defined for the coordinate system mesh 3 so that the coordinate system mesh 3 is separated into a solid region S and a fluid region F to define the fluid model.

Figure 6:
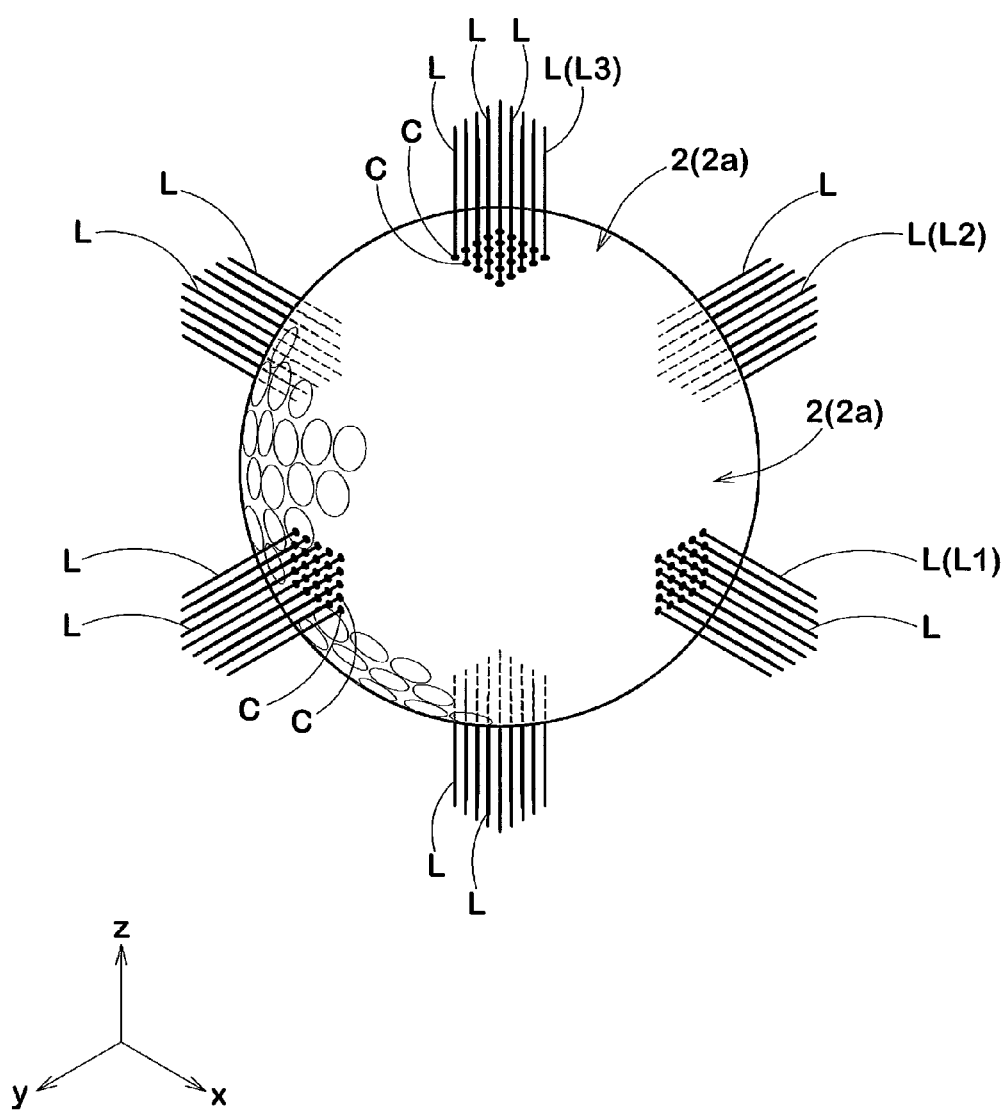
FIG. 6 is a perspective view for explaining the concept of the boundary definition processing.

Explaining the boundary definition processing on a conceptual basis, a large number of straight lines L passing through the grid points 3a are drawn, and as diagrammatically shown in FIG. 6, intersecting points C of the straight lines L with the surface of the solid object model 2 are computationally obtained. Then, using the obtained intersecting points C, the boundary is defined.

Figure 13:
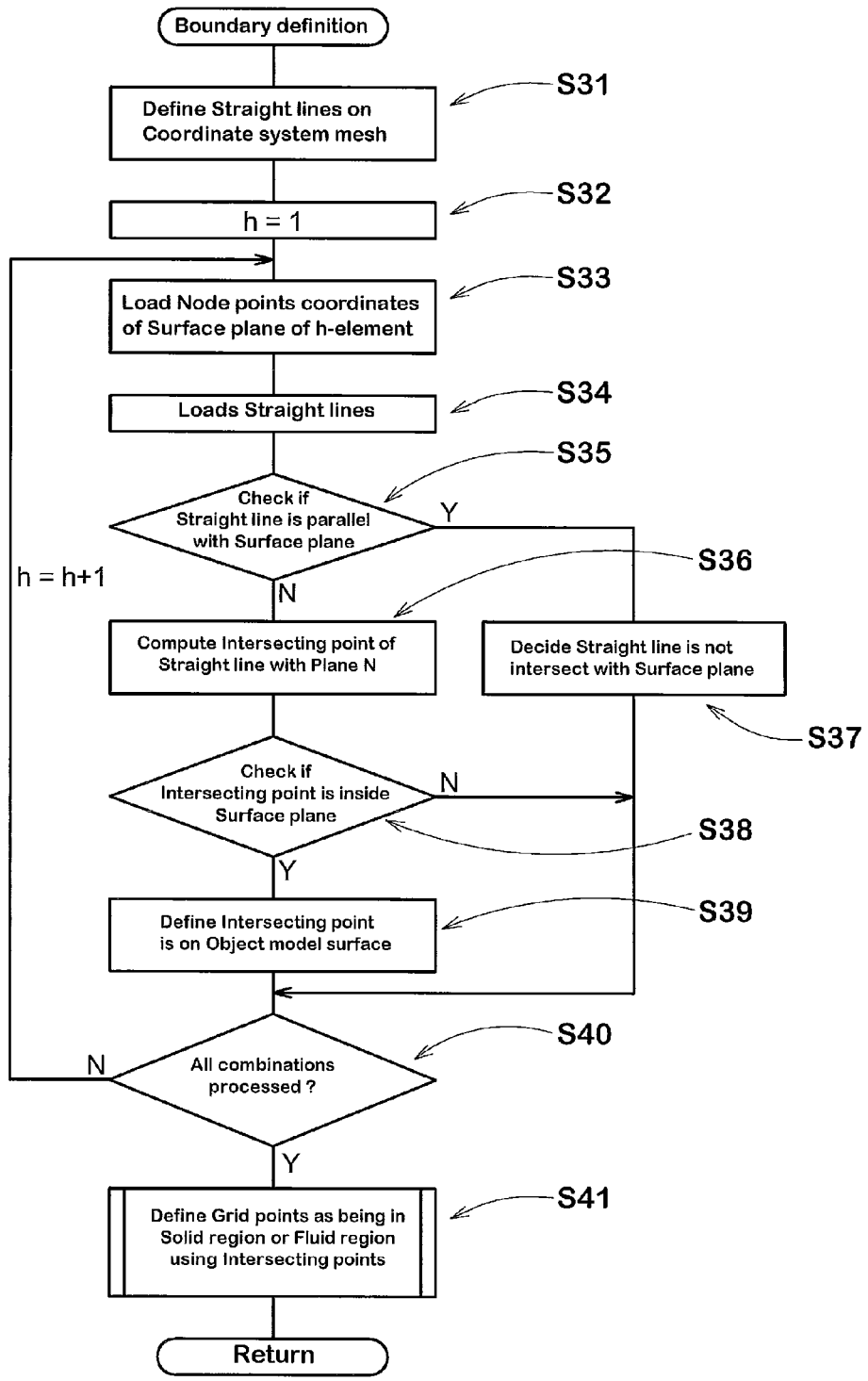
FIG. 13 is a flow chart for explaining the boundary definition processing of the method according to the present invention.

An example of flow chart of the boundary definition processing performed by the computer 1 is shown in FIG. 13.

In this example, firstly, a large number of straight lines L passing through the grid points 3a of the coordinate system mesh 3 are defined (Step S31) so that
the straight lines L coincide with the mesh lines constituting the coordinate system mesh 3, and the straight lines L include
straight lines L1 parallel with X-axis,
straight lines L2 parallel with Y-axis and
straight lines L3 parallel with z-axis.
All of the mesh lines respectively have the straight lines L coinciding therewith, therefore, each of the grid points 3a is located on one of the straight lines L1, one of the straight lines L2 and one of the straight lines L3.
The number of the straight lines L1 is equal to the product of d2 and d3. The number of the straight lines L2 is equal to the product of d1 and d3. The number of the straight lines L3 is equal to the product of d1 and d2, wherein d1, d2 and d3 are the above-mentioned positive integers.
It is however, not always necessary to have all of the mesh lines coincide with the straight lines L. In other words, it is possible some of the mesh lines have no straight line L coinciding therewith as explained later.
It is enough for the straight lines L to have finite lengths such that the straight lines L extends across the solid object model completely in the X, Y and z-axis directions.

Next, a variable h is set to a starting value 1. (Step S32) This variable h is used as an index number of the above-mentioned element surface plane (n) to be possessed.

Figure 7:
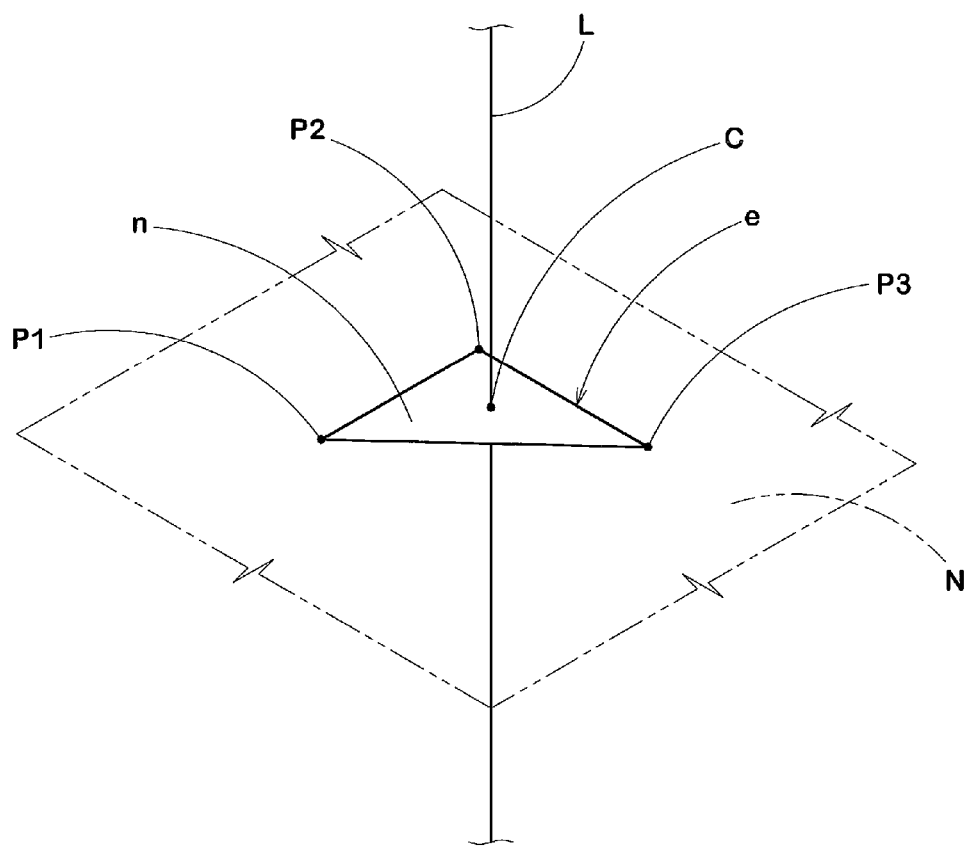
FIG. 7 is a perspective view for explaining a intersecting point of a straight line with a planar element of the solid object model.

Then, the coordinates of the node points of the h-numbered element surface plane (n) are loaded onto the working memory. (Step S33)
In this example, the element (e) is a triangle planar element (e) as shown in FIG. 7.
In this step S33, therefore, the coordinate values of the three node points P1, P2 and P3 defining the element surface plane (n) are loaded onto the working memory.
In order to perform this processing quickly, it is preferable that a database of the coordinate values of the node points of all of the element surface planes (n) which are indexed by the numbers (h) are prepared and stored in the computer 1 beforehand.

Then, the computer 1 loads data (equations) for defining all of the straight lines L onto working memory. (step S34)

Then, for each of the straight lines L, it is checked if the current straight line L and the h-numbered element surface plane (n) are parallel with each other. (step S35)

If "Yes" in this Step S35, namely, the current straight line L is parallel with the h-numbered element surface plane (n), then it is decided that the current straight line does not intersect with the h-numbered element surface plane (n). (Step S37)

If "No" in the Step S35, namely, the current straight line L is not parallel with the h-numbered element surface plane (n), then the intersecting point of the current straight line L with a plane N is computed. (Step S36)

Here, the plane N is, as shown in FIG. 7, a plane including the h-numbered element surface plane (n).
The plane N is defined by an equation using the coordinates of the node points (P1-P3) of the h-numbered element surface plane (n).
Thus, the intersecting point of the current straight line L and the plane N relating to the h-numbered element surface plane (n) can be obtained by solving the system of the equation defining the plane N and the equation defining the current straight line L.
The equation defining the plane N is preferably included in the above-mentioned database together with the coordinate values of the node points for each of the element surface planes (n).
Further, it is checked if the intersecting point obtained in the Step S36 is inside the h-numbered element surface plane (n). (Step S38)
If "Yes" in the Step S38, namely, the intersecting point C is inside the h-numbered element surface plane (n), then the intersecting point is decided and stored as an intersecting point C of the current straight line L with the surface of the object model 2. (Step S39)

The above-mentioned processing is performed for every element surface plane (n) by incrementing the variable h (namely index number) one by one. (Step S40)

Accordingly, with respect to all of the element surface planes (n) constituting the surface of the solid object model 2, it is determined whether or not they are intersected by the straight lines L. Further, with respect to all of the straight lines L, it is determined whether or not they intersect the element surface planes (n) constituting the surface of the object model 2.

Next, according to the obtained intersecting points C, the boundary between the solid object model 2 and the fluid model is defined on the coordinate system mesh 3. (step S41)

Figure 8:
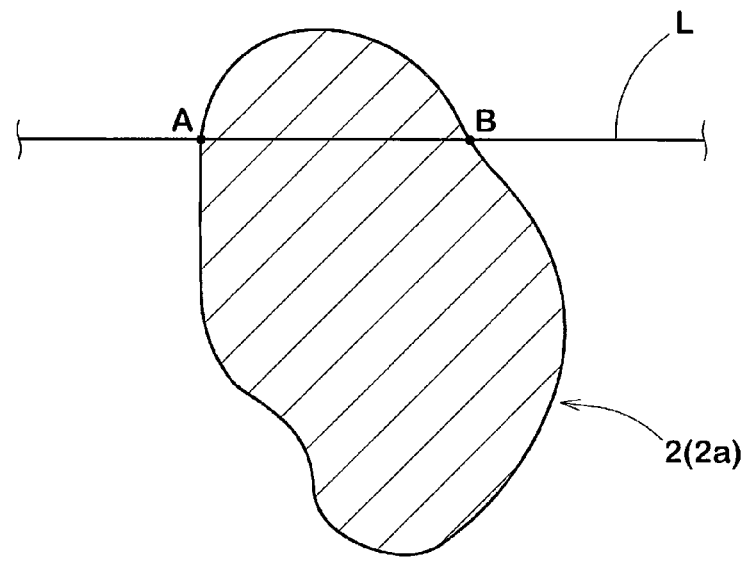
FIGS. 8 and 9 are diagrams for explaining the number of intersections of one straight line with one solid object model.
Figure 9:
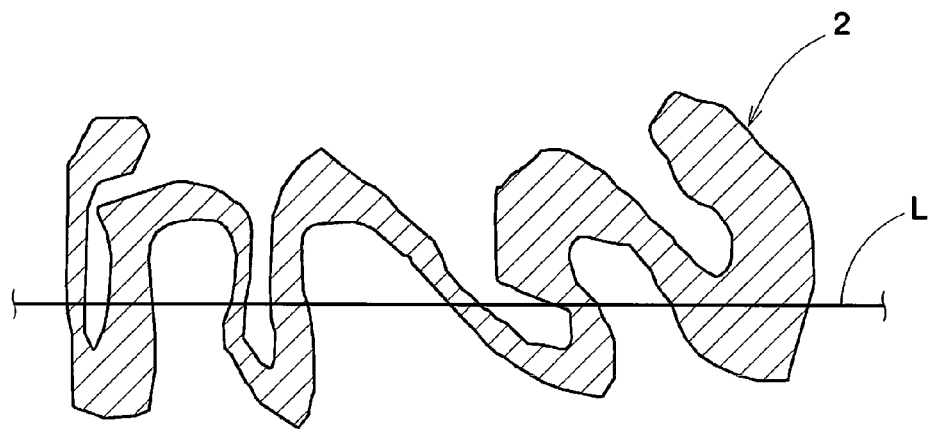

The processing of the definition of the boundary in this embodiment is based on the fact that:
when a solid object model 2 is intersected by a straight line L which is substantially infinite in length (namely sufficiently longer than the solid object model),
the number of intersections of the straight line L with the surface of the solid object model 2 is always an even number as shown in FIG. 8 and FIG. 9.
In FIG. 8, the straight line L intersects the surface of the solid object model 2 at only two points A and B.
In FIG. 9, the straight line L intersects the surface of the solid object model 2 more than twice, and in this particular case, the number of intersection is 14.

Figure 10:
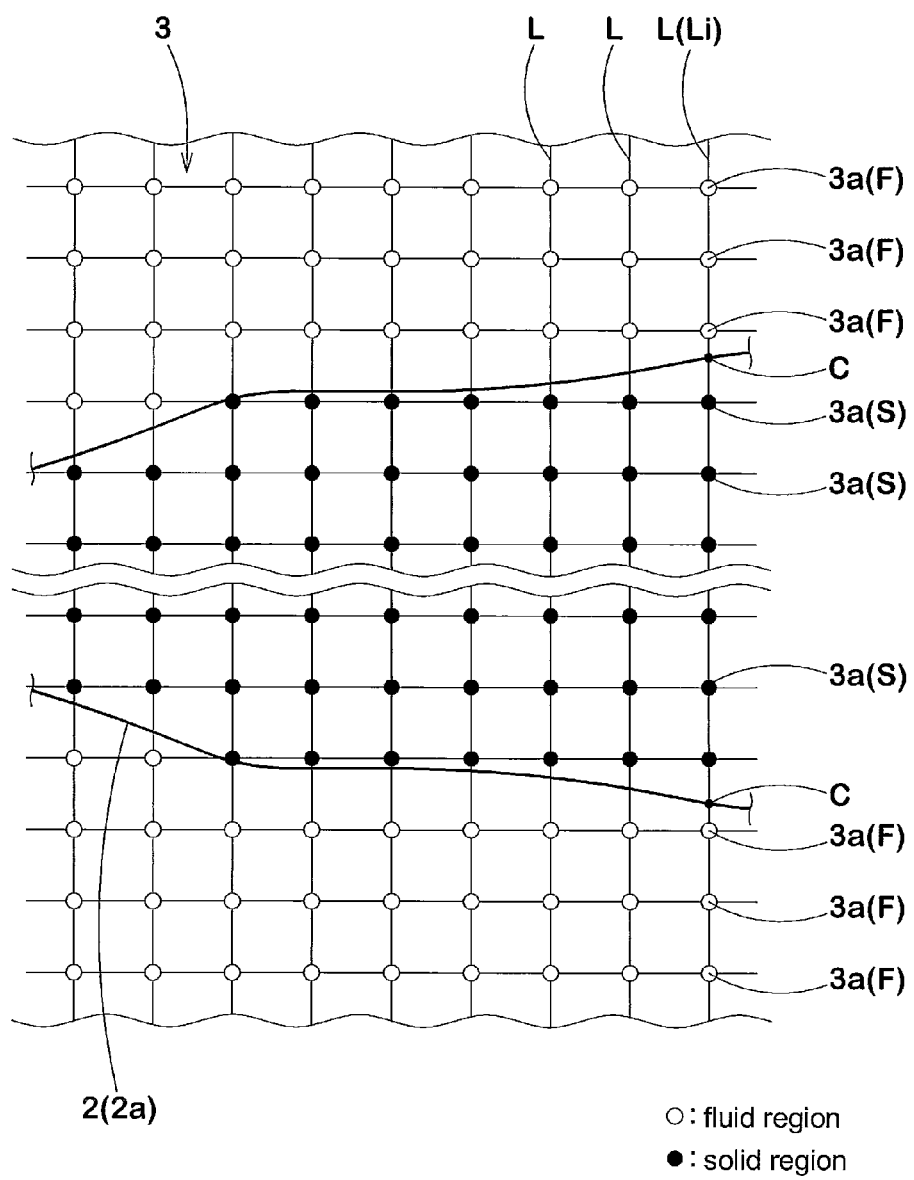
FIG. 10 is a diagram for explaining the boundary between a solid region and fluid region of the coordinate system mesh.

Accordingly, counted in either direction of the straight line L, the odd-numbered intersecting points are of the intersection from the outside towards the inside of the solid object model 2, and
the even-numbered intersecting points are of the intersection from the inside towards the outside of the solid object model 2. Therefore, as shown in FIG. 10. some of the grid points 3a (filled circle) on the straight line L which exist between an odd-numbered intersecting point and an even-numbered intersecting point next thereto are considered and defined as being positioned in the solid region S (inside the solid object model), and
the remaining grid points 3a on the straight line L (open circle) are considered and defined as being positioned in the fluid region F (outside the solid object model).

With respect to a straight line L which has intersecting points C whose number g is an even number (for example more than 2), when the 1st, 2nd, 3rd - - - g-th intersecting points C in the order of intersection in a direction of the straight line L are expressed by C1, C2, C3 - - - Cg, namely, the suffix number to C is given in the order of the intersection, grid point(s) $3a$ on the straight line L existing between the intersecting points C[i] and C[i+1] (i is an odd number from 1 to g−1) is considered and defined as being in the solid region S, and the remaining grid points $3a$ on the straight line L are considered and defined as being in the fluid region F.

Then, among the grid points $3a$ defined as being positioned in the fluid region F, those located next to the grid points $3a$ defined as being positioned in the solid region S, are defined or marked as boundary points representing the boundary in performing computer simulations.

Therefore, in this step S41, firstly, with respect to each of the straight lines L, it is checked if the straight line L intersects the surface of the solid object model 2.

If "Yes", the computer 1 determines and stores the intersecting order of the intersecting points C in a predetermined direction of the straight line L.

As explained, by using the coordinates of the intersecting points C of the straight line L and the order of intersections, the boundary between the solid region S and fluid region F can be easily located, regardless of whether the configuration of the solid object model 2 is simple or complex.

As have been explained, in the case of the orthogonal mesh M, the straight lines L include the straight lines L1 parallel with x-axis,
the straight lines L2 parallel with Y-axis and
the straight lines L3 parallel with Z-axis.

Therefore, the above-described processing is performed for the straight lines L1, L2 and L3.

Cylindrical Coordinate System

Figure 11:
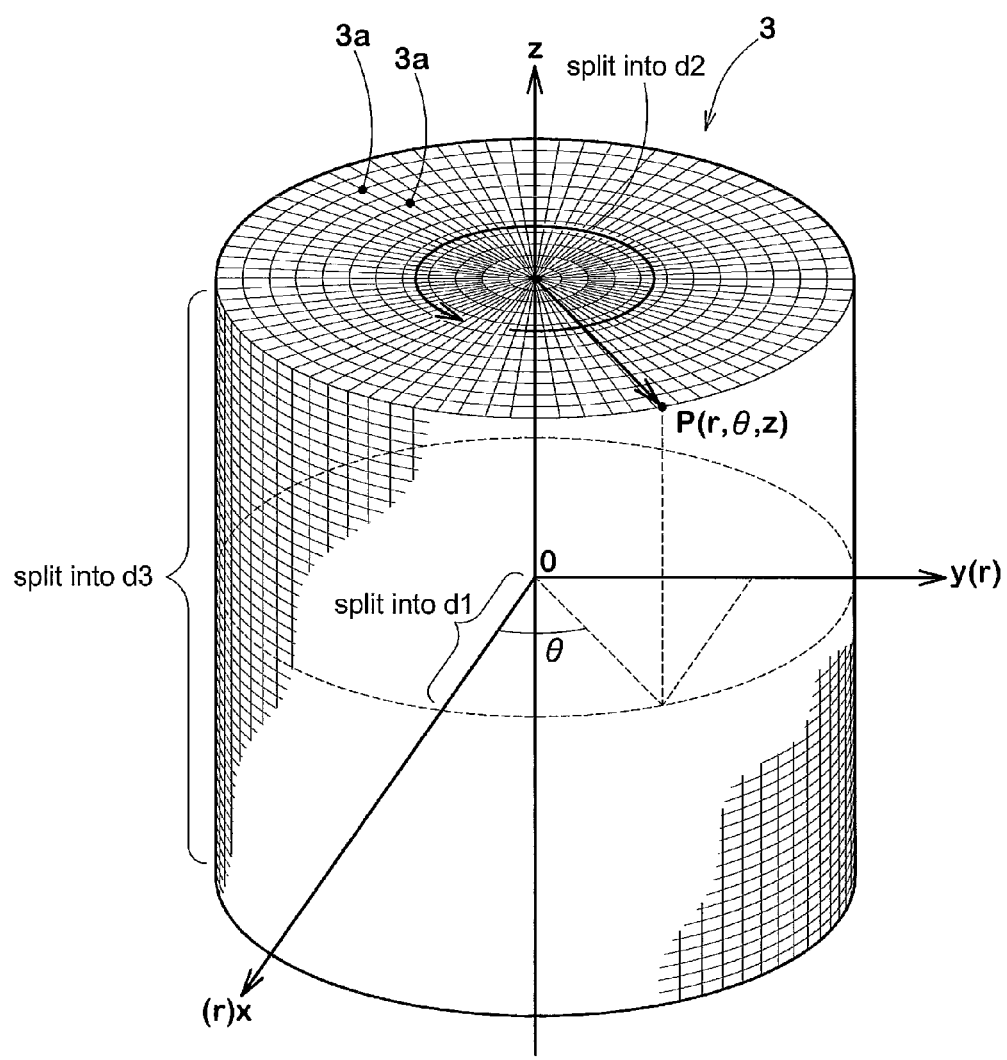
FIG. 11 is a perspective view of a cylindrical coordinate system mesh.

FIG. 11 shows another example of the coordinate system mesh 3 in which a cylindrical coordinate system is employed as the basic coordinate system.

In this example, the coordinate system mesh 3 is a cylindrical Eulerian mesh M which is divided by a positive integer d1 in polar axis direction (r),
a positive integer d2 in azimuth direction ($\theta$) and
a positive integer d3 in cylindrical axis direction (z) in the r-$\theta$-z cylindrical coordinate system.

The grid points $3a$ are disposed at cross-points of the mesh lines of the mesh M.

The above-mentioned straight lines L are coincide with the straight mesh lines, therefore, in this example, the straight lines L are 1) straight lines L4 extending radially from and perpendicularly to the cylindrical axis z, the number of which is equal to the product of d2 and d3, and 2) straight lines L5 extending parallel with the cylindrical axis z, the number of which is equal to the product of d1 and d2.

Each of the grid points $3a$ is disposed on one of the straight lines L4 and one of the straight lines L5.

Therefore, the above-described processing is performed for the straight lines L4 and L5 only. This helps to reduce the computing time.

Spherical Coordinate System

Figure 12:
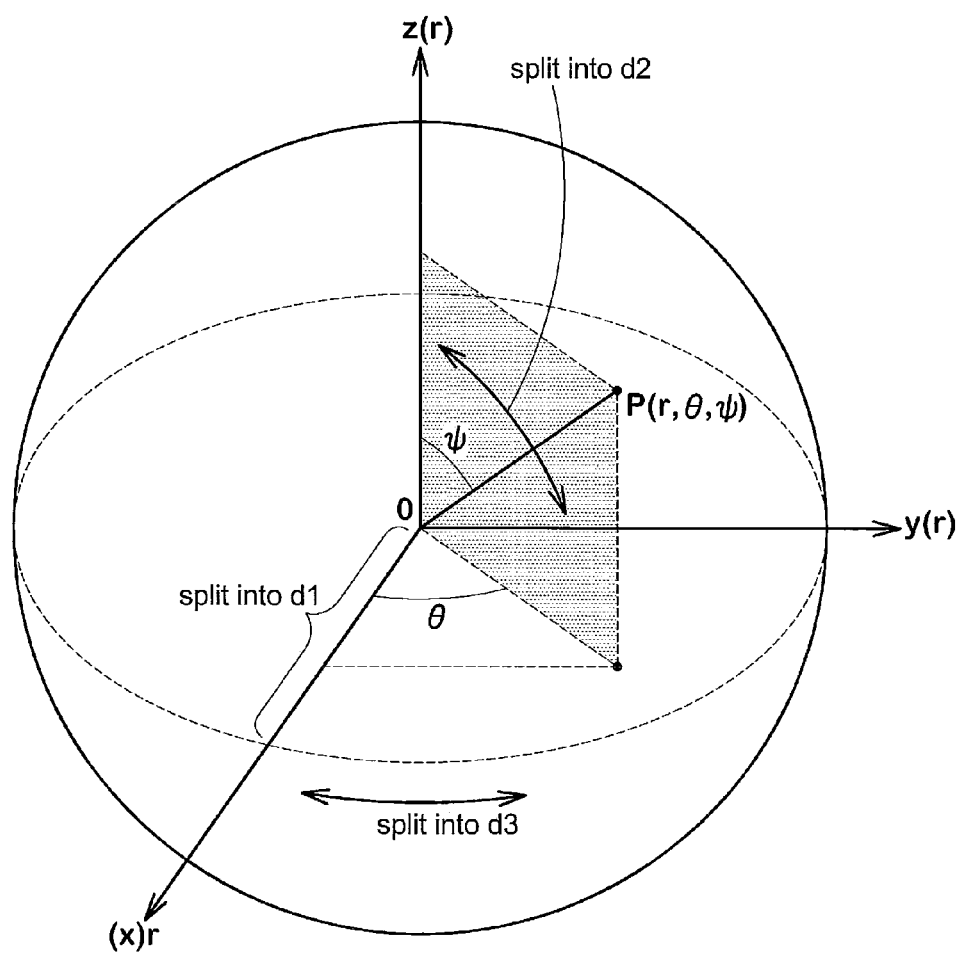
FIG. 12 is a perspective view for explaining a spherical coordinate system mesh.

FIG. 12 shows another example of the coordinate system mesh 3 in which a spherical coordinate system is employed as the basic coordinate system.

In this example, the coordinate system mesh 3 is a spherical Eulerian mesh M which is divided by
a positive integer d1 in radial direction (r)
a positive integer d3 in azimuth angle direction ($\theta$)
a positive integer d2 in inclination angle direction ($\phi$) in the r-$\theta$-$\phi$ spherical coordinate system.

The grid points $3a$ are disposed at cross-points of the mesh lines of the mesh M.

The above-mentioned straight lines L are coincide with the straight mesh lines, therefore, in this example, the straight lines L are straight lines L6 extending radially from the origin O of the coordinate system, the number of which is equal to the product of d2 and d3.

Each of the grid points $3a$ is disposed on one of the straight lines L6.

Therefore, the above-described processing is performed for only the straight lines L6. This helps to greatly reduce the computing time.

In either coordinate system, the boundary can be defined by using the intersecting points C of the straight lines L with the element surface planes (n) as explained above.

Accordingly, in comparison with conventional algorithms which search, in a three-dimensional space, grid points nearest to the node points of elements constituting the surface of the solid object model 2, the computing is simplified and the computing time can be greatly reduced.

Further, the grid points $3a$ on the straight line L falling between the boundary points can be defined as being in the solid region S on the block.

Therefore, it is possible to speed up the process of marking the grid points as being positioned in the solid region S.

Incidentally, in the case that the solid object model 2 relocates and/or rotates and the boundary position is altered relatively to the coordinate system mesh 3, the above-mentioned boundary definition processing is repeated to define new boundary on the coordinate system mesh 3.

Next, an example of the processing of the step S41 which can define the boundary points at high speed will be described.

This example is based on the Inventers' earlier patent application, U.S. Ser. No. 12/897,003, the entire contents of which are incorporated herein by reference, wherein a set of real numbers x[i] and a query point q (a real number) are given, and the real numbers x[i] are searched for a nearest neighbor namely a real number closest to the query point q, wherein the nearest neighbor search is performed by the use of a database of the real numbers x[i] (wherein "i" is an integral numbers from 1 to n, and x[1]<x[2]<x[3]< - - - <x[n−1]<x[n]). This nearest neighbor search method is particularly useful when the grid points $3a$ on each straight line L are unevenly disposed.

Specifically, with respect to each of the straight lines L, the coordinates of the grid points $3a$ on the straight line L are expressed by one-dimensional coordinate values based on a one-dimensional coordinate system defined along the straight line L, and these one-dimensional coordinate values are used as the above-mentioned set of real numbers x[i].

As to the query point q, a one-dimensional coordinate value of the intersecting point C in the same one-dimensional coordinate system is used.

The nearest neighbor search method in this example comprises:

a construction phase S41a in which the database of the real numbers x[i] for search is prepared in the computer 1; and a search phase S41b in which, by the use of the database, the computer 1 searches one of the real numbers x[i] which is closest to the query point q.

The construction phase S41s is performed only once before the search phase S41b.

The database for search includes, with respect to each of the straight lines L, a set of real numbers (x[1], x[2], x[3] - - - x[n]) corresponding to the above-mentioned one-dimensional coordinate values of the grid points 3a on the straight line L.

Figure 14:
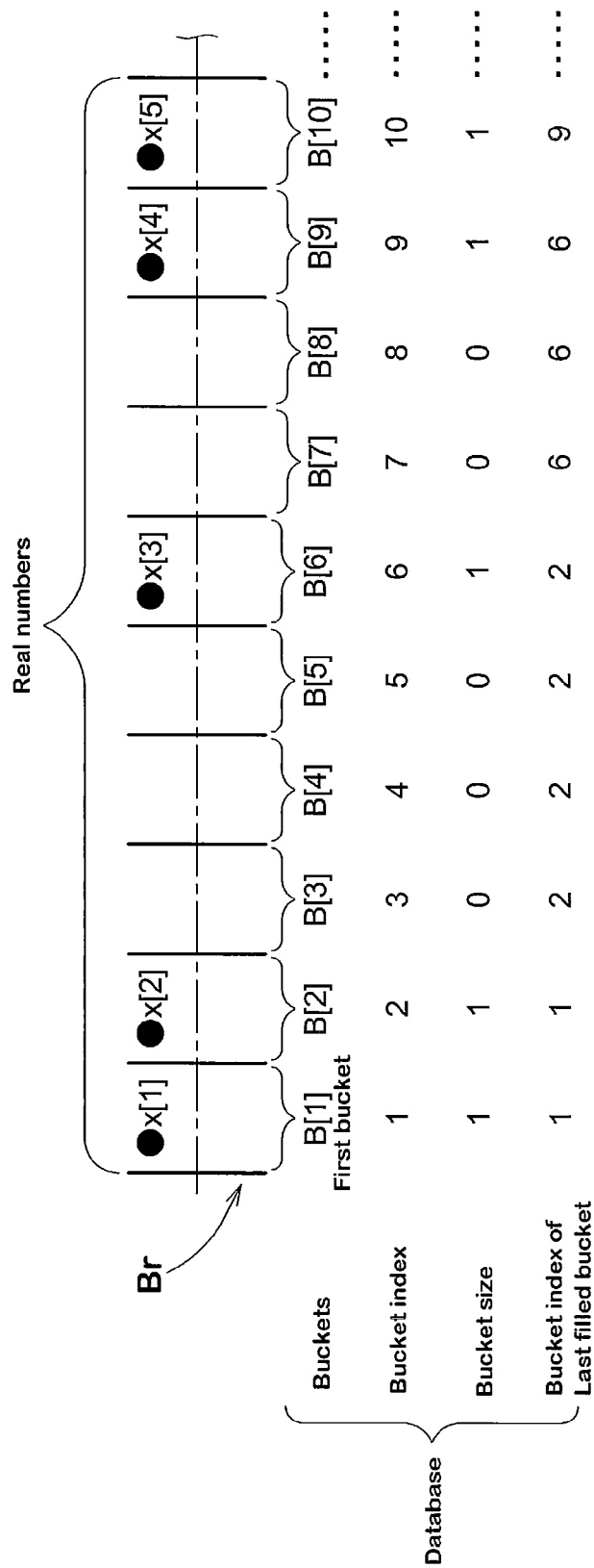
FIG. 14 is a diagram for explaining a database structure for use in the nearest neighbor search processing employed in the embodiment of the invention.

Further, the database includes a series Br of buckets B per each set of the real numbers (x[1], x[2], x[3] - - - x[n]) as shown in FIG. 14.

The buckets B respectively correspond to small one-dimensional spaces defined by dividing a one-dimensional space between a minimum real number x[1] and a maximum real number x[n] at regular intervals, whereby
the number of the buckets B and the number of the small one-dimensional spaces are the same integral number m.
Accordingly, each bucket B[j] can be considered as a one-dimensional space between a real number y1 and a real numbers y2, wherein y1<y2, and
the difference y2−y1 is constant through all the buckets.

All of the buckets B are provided with unique indexes called "bucket index".
A bucket B with a bucket index j is denoted by bucket B[j] (j: 1 to m). Therefore, if one or more of the real numbers x[i] (i: 1 to n) satisfy a condition y1<x[i]<y2 of either one of the buckets B[j] (j: 1 to m), then
the one or more of the real numbers are determined as belonging to the bucket, and the bucket comprises data about the one or more of the real numbers.

Each of the buckets B[j] comprises data about its bucket size. The bucket size is the number of the real number(s) x[i] belonging to the bucket B[j] under consideration.
In the case that there is no real number belonging to the bucket under consideration, the bucket size is zero, therefore, the bucket comprises such data that the bucket size is zero.
For example, in FIG. 14, the buckets B[1], B[2], B[6], B[9] and B[10] each have one real number x[1], x[2], x[3], x[4], x[5], respectively, therefore, the bucket sizes of these buckets B are equal to 1.
The buckets B[3], B[4], B[5], B[7] and B[8] have no real number, therefore, these buckets comprise date about the bucket sizes being equal to zero.

Each of the buckets B[j] further comprises data about a bucket index of a last filled bucket ("BIofLFB" for short). Here, the last filled bucket is a bucket whose bucket size is not zero and whose bucket index is nearest to the bucket index of the bucket under consideration.
In this invention, it is possible to treat the term "nearest" as having one of the following three meanings:
(1) nearest on the first bucket side of the bucket under consideration,
(2) nearest on the final bucket side of the bucket under consideration,
(3) nearest literally or regardless of the first bucket side and final bucket side.

The computer 1 scans the real numbers x[1] - - - x[n] in ascending order, starting from x[1] to x[n], in order to determine if each real number x[i] satisfies a condition y1<x[i]<y2 of either one of the buckets, and thereby to determine which one of the buckets the real number x[i] belongs to.

During this scan operation performed from x[1] to x[n], if the bucket whose bucket size is not zero is found, then the bucket index thereof is put in a variable for BIofLFB allocated on working memory.

In the case of the first bucket B[1], its own bucket index, namely, "1" is treated as the BIofLFB, and the first bucket B[1] comprises data about the BIofLFB being 1.

Each bucket whose bucket size is not zero, further, comprises data about the minimum and maximum of the real number(s) belonging to the bucket under consideration.
In the case that the bucket size is "1", namely, only a single real number belongs to the bucket under consideration, this single real number is treated as the minimum and maximum real numbers. Namely, the minimum and maximum real numbers are equal to the single real number.

Figure 15:
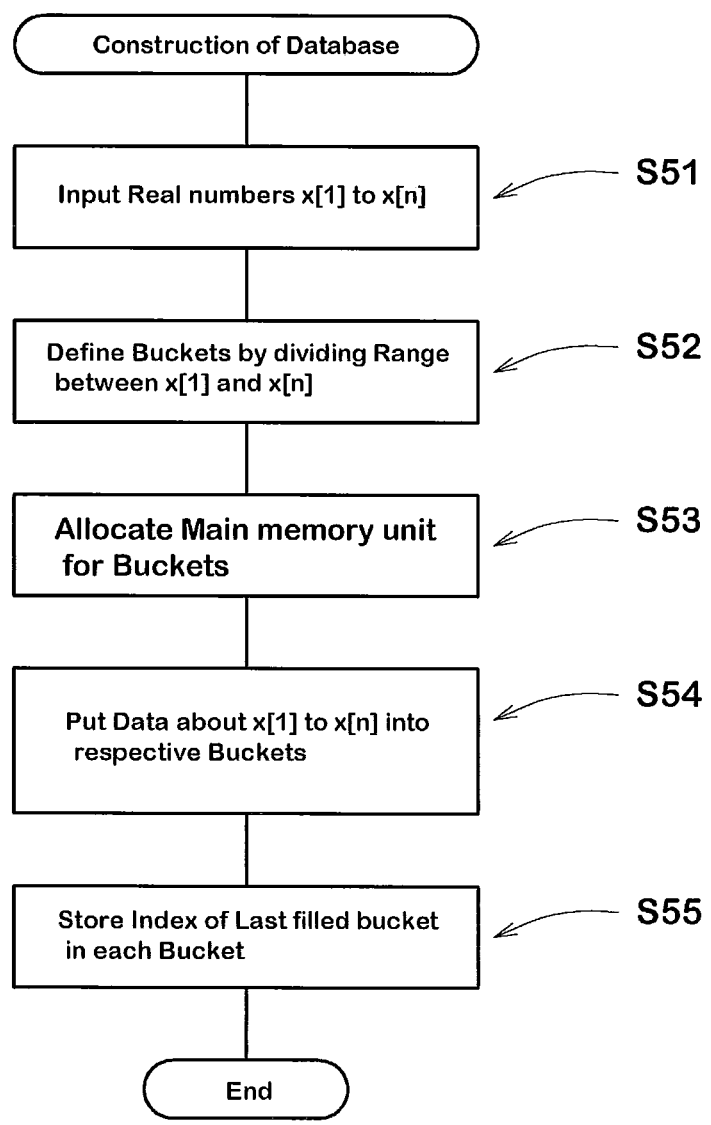
FIG. 15 is a flow chart showing a procedure for constituting the database for search.

FIG. 15 shows an example of the construction phase S41a, wherein:—

Firstly, the central processing unit loads the set of real numbers (x[1], x[2], x[3] - - - x[n]) in working memory. (Step S51).

The central processing unit defines the range (y1 to y2) of each bucket based on the range (x[1] to x[n]) of the real numbers divided by the number m.—(Step S52)
For example, the integral number m is set in a range between about 2 times and several times the number n of the real numbers x[1] to x[n].

The central processing unit allocate main memory for the buckets B[1] to B[m] needed for storing data about the bucket size, the BIofLFB, the real number(s) and the minimum and maximum thereof. (Step S53)

The central processing unit puts data about the real numbers x[1] to x[n] into the respective buckets in the main memory.—(Step S54)
In this Step S54, using the integral number m and the real numbers x[1] and x[n], the spatial size Δx of a bucket is determined by the following expression (1).

$$\Delta x = (x[n] - x[1])/m \tag{1}$$

All of the buckets have the same spatial size Δx.
Then, for each of the real numbers x[i] (i: 1 to n), the central processing unit evaluates the following expression (2).

$$i\text{bucket} = \#\text{floor}((x[i] - x[1])/\Delta x) + 1 \tag{2}$$

wherein #floor(y) is a function which returns the largest integral value not greater than y.
Through this evaluation, it is determined that the real number x[i] belongs to bucket B[ibucket] (namely, a bucket whose bucket index is "ibucket").
Therefore, the central processing unit puts data about the real number x[i] into the bucket B[ibucket], and performs the calculation of the following assignment expression (3) in order to increment the bucket size stored in the bucket B[ibucket] by one.

$$\text{bucket size} = \text{bucket size} + 1 \tag{3}$$

If need arises as a results of the inclusion of the real number x[i] into the bucket B[ibucket], then the central processing unit updates the minimum real number and/or maximum real number stored in the bucket B[ibucket].

In the meantime, there is a possibility that the database include buckets whose bucket size is zero. Accordingly, it is expedient to exclude such zero-size buckets from the nearest neighbor search.

Therefore, for each of the buckets B[j] excepting the first bucket B[1], the central processing unit determines the BIofLFB, and stores data about the BIofLFB in the bucket B[j].—(Step S55)
This Step S15 is as follows.
In this embodiment in which the above-mentioned meaning (1) of the term "nearest" is adopted, the last filled bucket is a bucket whose bucket size is not zero and whose bucket index is nearest to the bucket under consideration on the first bucket side.

Therefore, the last filled bucket is defined by the following conditions (a), (b) and (c):
(a) p<k
(b) bucket size of bucket B[p]>0
(c) difference k−p is minimum
wherein
p is the BIofLFB, and
k is the bucket index of the current bucket under consideration.

Figure 16:
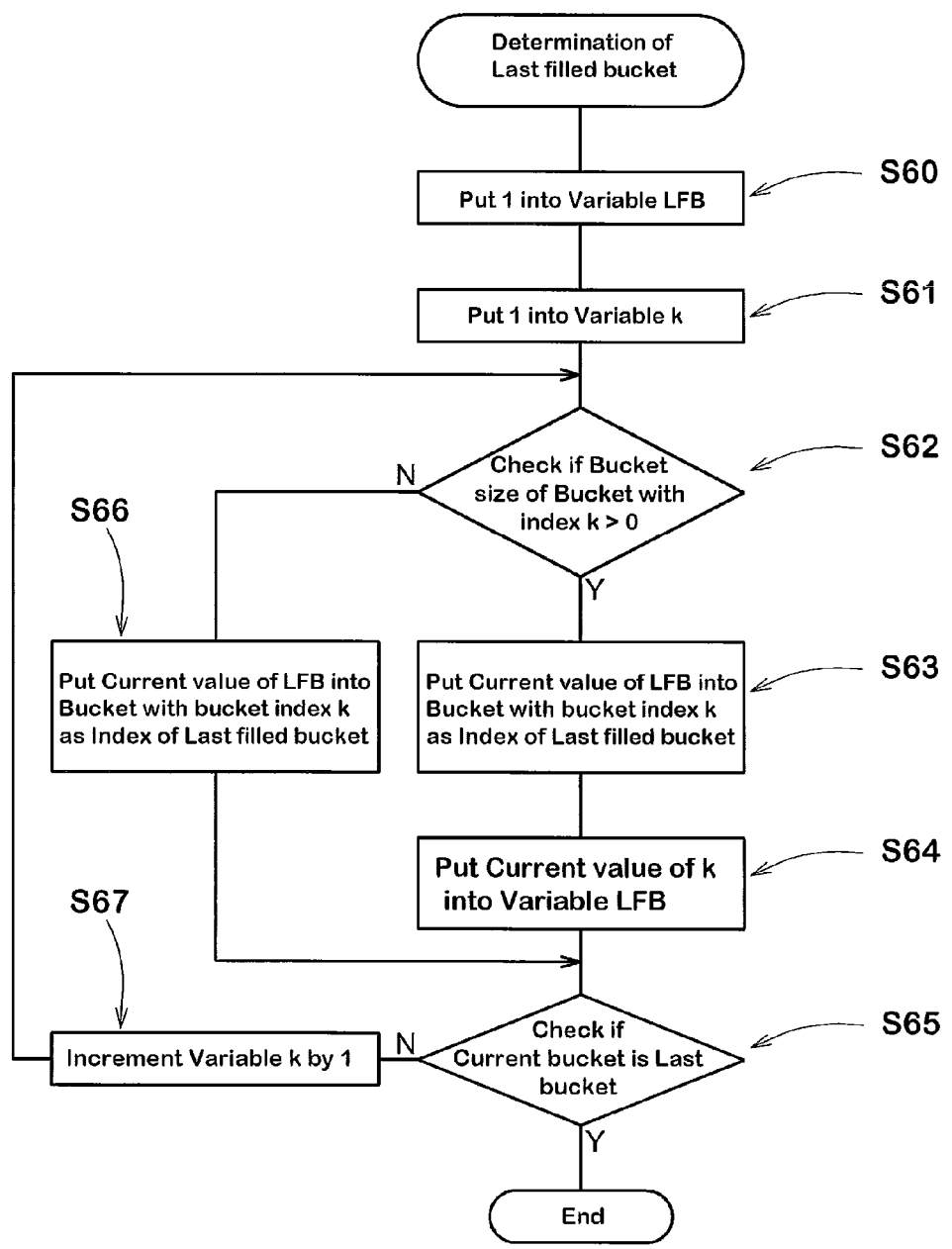
FIG. 16 is a flow chart showing a procedure for defining the last filled bucket.

FIG. 16 shows an example of a sequence of operations by which the central processing unit determines the BIofLFB.

First, the central processing unit puts 1 (integral number) into both of a variable LFB and a variable k.—(step S60, S61)

With respect to the bucket B with bucket index equal to the variable k (hereinafter "bucket B[var.k]" for short), the central processing unit determines if the bucket size is more than zero.—(step S62)

In the Step S62, if the result is true (Y) (namely, more than zero), then the central processing unit stores the current value of the variable LFB in the bucket B[var.k] as the date about the BIofLFB.—(step S63)

Then, the central processing unit updates the variable LFB to be equal to the bucket index of the current bucket B[var.k].—(step S64)

Then the sequence goes to Step S65.

on the other hand, in the Step S62, if the result is false (No) (namely, equal to zero), then the central processing unit stores the current value of the variable LFB in the bucket B[var.k] as the date about the BIofLFB.—(step S66)

Then the sequence goes to step S65, without updating or changing the variable LFB.

In the step S65, the central processing unit checks if the variable k which is the bucket index of the current bucket is equal to the bucket index of the last bucket (namely, m).

If the result is true (Yes) (namely, value of k=m), then the construction phase ends.

on the other hand, if the result is false (No) (namely, value of k<m), then the central processing unit increments the variable k by one (step S67), and the sequence goes to the step S62.

These steps are repeated till the last bucket B[m].

Through the construction phase, the database for used in the search phase S41b is prepared. Such construction phase is performed only once before the search phase S41b.

Usually, the main memory is faster in the access speed than the storage device, therefore, the database is allocated on the main memory. It is however also possible to allocate the database on the storage device.

Figure 17:
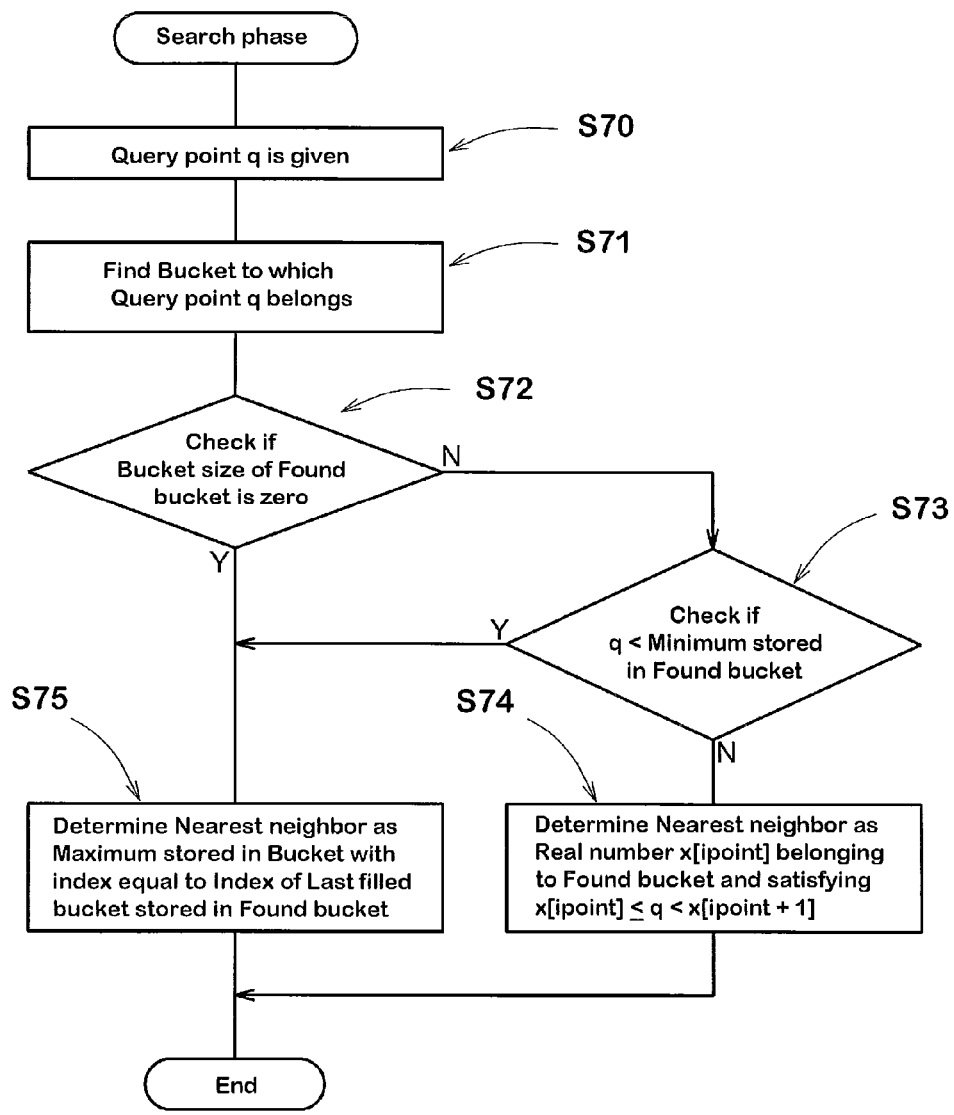
FIG. 17 is a flow chart showing a procedure for the nearest neighbor search.

FIG. 17 shows an example of a sequence of operations by which the central processing unit determines the nearest neighbor.

when the coordinate value of an intersecting point C is given as a query point q with respect to each of the straight lines L (step S70), the central processing unit determines the bucket index "ibucket" of a bucket which the query point q belongs to.—(step S71)

As explained above, all of the buckets have the identical spatial size Δx. Therefore, the bucket index "ibucket" can be obtained easily by evaluating the following expression (4).

$$i\text{bucket} = \#\text{floor}((q-x[1])/\Delta x) + 1 \quad (4)$$

wherein, #floor(y) is a function which returns the largest integral value not greater than y.

Then, the central processing unit checks if the bucket size of the bucket B[ibucket] is zero.—(step S72)

In the step S72, if the result is false (No) (namely, bucket size>0), then the central processing unit searches the real number(s) belonging to or contained in the bucket B[ibucket] for the nearest neighbor.—(step S73, step S74)

More specifically, the central processing unit compares the query point q with the minimum real number stored in the bucket B[ibucket].

If the query point q is less than the minimum real number (in the step S73, Yes), then it is determined that the nearest neighbor is the maximum real number stored in the last filled bucket whose bucket index is stored in the bucket B[ibucket].—(step S75)

If the query point q is not less than the minimum number (in the step S73, No), then the central processing unit searches the real number(s) belonging to or contained in the bucket B[ibucket] for a real number x[ipoint] which satisfies a condition x[ipoint]=≤q≤x[ipoint+1], and it is determined that the nearest neighbor is the real number x[ipoint].—(Step S74)

In the step S72, if the result is true (Yes) (namely, bucket size=0), then, for the nearest neighbor, the central processing unit searches the real number(s) belonging to or contained in the last filled bucket whose bucket index is stored in the bucket B[ibucket].—(step S75)

According to this method, as explained above, the whole search is performed on one of the buckets during the subsequent steps to the step S72.

Therefore, the nearest neighbor can be found very quickly, and the computing time can be greatly decreased.

In the above-explained example, a real number not more than the query point q and nearest to the query point q is found as the nearest neighbor.

But, it is also possible to find the nearest neighbor as a real number not less than the query point q and nearest to the query point q.—the above-mentioned meaning (2)

In order to find this type of nearest neighbor, it is necessary to change as follows:

the BIofLFB is the bucket index of a bucket which is nearest to the bucket under consideration on the last bucket side of the bucket under consideration;

in the step S73, the maximum real number is substituted for the minimum real number;

in the step S75, the minimum real number is substituted for the maximum real number; and in the step S74, the nearest neighbor is a real number x[ipoint] satisfying a condition x[ipoint]>=q>x[ipoint−1].

Comparison Tests

In order to confirm advantageous effects of the present invention, by the use of an HP xw9300 workstation with 32 GB system memory, computing time required to define the boundary on the coordinate system mesh (Boundary definition time in Table 1) was measured. Further, computing time required to marking or defining grid points as positioned in the solid region (Solid marking time in Table 1) was measured.

The solid object model was a closed surface model of a golf ball, wherein the radius was 21.35 mm, and only the surface was modeled with rigid triangular planar Lagrangian elements, and the total number of the node points was 3,755,598.

The coordinate system mesh (fluid model) was a cylindrical mesh based on a cylindrical coordinate system (r,θ,z), wherein the radius was 220 mm, the size in the cylindrical axis direction was 440 mm, the division numbers, namely, the above-mentioned positive integers d1 in polar axis direction (r), positive integer d2 in azimuth direction (θ) and positive integer d3 in cylindrical axis direction (z) were as follows.

| Division numbers | d1 | d2 | d3 |
|---|---|---|---|
| model 1 | 252 | 2502 | 100 |
| model 2 | 502 | 3002 | 100 |

Further, for comparison, the following ANN program (nearest neighbor search program) was downloaded from the following Internet website, and the boundary definition time and solid marking time were measured.
ANN program:
   A Library for Approximate Nearest Neighbor Searching
   David M. Mount and Sunil Arya
   Version 1.1.1
   Release Date Aug. 4, 2006
   URL http://www.cs.umd.edu/~mount/ANN/
Configurations of ANN program during computing:
   validate off
   stats query stats
   dim 3
   data size 150700400
   query size 3755598
   read data pts test1-data.pts
   read query pts test1-query.pts
   bucket size 1
   near neigh 1
   split rule suggest
   shrink rule none
   build ann
   epsilon 0.0
   run queries priority
The test results are as follows.

| Method | Ref. 1 (ANN1) | Ref. 2 (ANN3) | Embodiment |
|---|---|---|---|
| Boundary definition time | | | |
| (sec) | | | |
| model 1 | 208.8 | 165.6 | 0.55 |
| model 2 | 401.2 | 340.9 | 0.55 |
| Solid marking time (sec) | | | |
| model 1 | 59.18 | — | 1.44 |
| model 2 | 90.18 | — | 2.00 |

ANN1: bucket size was 1 (default value)
ANN3: bucket size was 3

In Embodiment: In order to define the boundary points, the method as claimed in claim 1 was used. As to the method to mark up or define grid points as positioned in the solid region, grid points on each straight line existing between the boundary points were marked up on the block.
In Ref. 1: Grid points positioned in the solid region were marked up by the use of a well known flood fill algorithm.

From the test results, it was confirmed that the present invention remarkably shorten the boundary definition time and solid marking time.

The invention claimed is:
1. A method for defining a fluid/solid boundary for computational fluid dynamics simulations making use of
   a coordinate system mesh which models a region of three-dimensional space including a fluid region, and which is defined by a large number of grid points arranged in the region of three-dimensional space, and
   a solid object model which models a solid object, and whose surface is constituted by planes of finite elements,
wherein the method comprises
a step (a) of preparing the solid object model in a computer,
a step (b) of preparing the coordinate system mesh in the computer,
a step (c) of defining, in the computer, straight lines which extend across the above-mentioned region of three-dimensional space, passing through the grid points,
a step (d) of obtaining intersecting points of the straight lines with the surface of the solid object model,
a step (e) in which, for each of the straight lines having the intersecting points, the grid points positioned on the straight line are searched for a nearest grid point to each of the intersecting points, and based on the searched-out nearest grid points, the grid points positioned on each of the straight lines are each determined as to whether the grid point is positioned inside the solid object model or in the fluid region,
whereby all of the grid points arranged in the region of three-dimensional space are determined as to whether the grid point is positioned in the fluid region or inside the solid object model and thereby the boundary between the solid object model and the fluid region is defined on the coordinate system mesh,
wherein, in the search process in the step (e) performed for each of the straight lines having the intersecting points in order to search the grid points positioned on the straight line for a nearest point to each of the intersecting points,
taking the coordinates of the grid points positioned on the straight line under consideration and the intersecting points thereof as one-dimensional values based on a one-dimensional coordinate system defined along the straight line under consideration, and
giving the one-dimensional coordinate values of the grid points as a set of real numbers $x[i]$ (i: 1 to n), and
giving the one-dimensional coordinate values of each of the intersecting points as a query point q,
the search of the grid points for a nearest point to each of the intersecting points is performed by a nearest neighbor search method comprising
a construction phase in which a database of the real numbers $x[i]$ (i: integers from 1 to n, assigned in ascending order of the real numbers) is prepared in a memory of the computer, and
a search phase in which the computer searches the nearest neighbor to the query point q by the use of the database, wherein
the database comprises a series of buckets,
the buckets respectively correspond to small one-dimensional spaces defined by dividing a one-dimensional space between a minimum real number $x[1]$ and a maximum real number $x[n]$ at regular intervals, whereby the number of the buckets and the number of the small one-dimensional spaces are the same integral number m,
the buckets have unique bucket indexes from the first bucket $B[1]$ to the last bucket $B[m]$,
each of the buckets comprises data about real number(s) falling in one of the small one-dimensional spaces corresponding to the bucket under consideration,
each of the buckets further comprises data about its bucket size, the bucket size defined by the number of real number(s) falling in one of the small one-dimensional spaces which corresponds to the bucket under consideration, each of the buckets excepting the first bucket B[1] further comprises data about the bucket index of a last filled bucket, the last filled bucket defined as a bucket whose bucket size is not zero and whose bucket index is closest to that of the bucket under consideration, and the search phase which comprises:

a first step of locating one of the buckets corresponding to one of the small one-dimensional spaces in which the query point q falls, a second step of checking the bucket size of the located bucket whether the bucket size thereof is zero or not, a third step of searching the nearest neighbor by the use of the data of real number(s) included in the located bucket if the checked bucket size is not zero, or a bucket with a bucket index equal to the bucket index of the last filled bucket included in the located bucket if the checked bucket size is zero.

2. The method according to claim 1, wherein said coordinate system mesh is defined based on a X-Y-Z orthogonal coordinate system so as to have straight mesh lines extending in the X-axis direction, the Y-axis direction and the Z-axis direction, said grid points are positioned on said straight mesh lines, and said straight lines are defined so as to coincide with said straight mesh lines.

3. The method according to claim 1, wherein said coordinate system mesh is defined based on a r-θ-z cylindrical coordinate system so as to have straight mesh lines extending in the cylindrical axis z direction and polar axis r directions, said grid points are positioned on said straight mesh lines, and said straight lines are defined so as to coincide with said straight mesh lines.

4. The method according to claim 1, wherein said coordinate system mesh is defined based on a r-θ-φ spherical coordinate system so as to have straight mesh lines extending in polar axis r directions, said grid points are positioned on said straight mesh lines, and said straight lines are defined so as to coincide with said straight mesh lines.

* * * * *